2 Sheets—Sheet 2.

L. W. STOCKWELL.
MACHINES FOR THREADING AND CUTTING OFF GAS-PIPES.

No. 173,190. Patented Feb. 8, 1876.

Witnesses
Inventor
Levi W. Stockwell
Per Bradford Howland
his Attorney.

N. PETERS, PHOTO-LITHOGRAPHER, WASHINGTON, D. C.

UNITED STATES PATENT OFFICE.

LEVI W. STOCKWELL, OF RAVENNA, OHIO.

IMPROVEMENT IN MACHINES FOR THREADING AND CUTTING OFF GAS-PIPES.

Specification forming part of Letters Patent No. 173,190, dated February 8, 1876; application filed July 31, 1875.

*To all whom it may concern:*

Be it known that I, LEVI W. STOCKWELL, of Ravenna, Portage county, Ohio, have invented certain Improvements in Machines for Threading and Cutting Off Gas-Pipes, of which the following is a specification:

The annexed drawings, consisting of two sheets, form a part of this specification.

Figure 1:
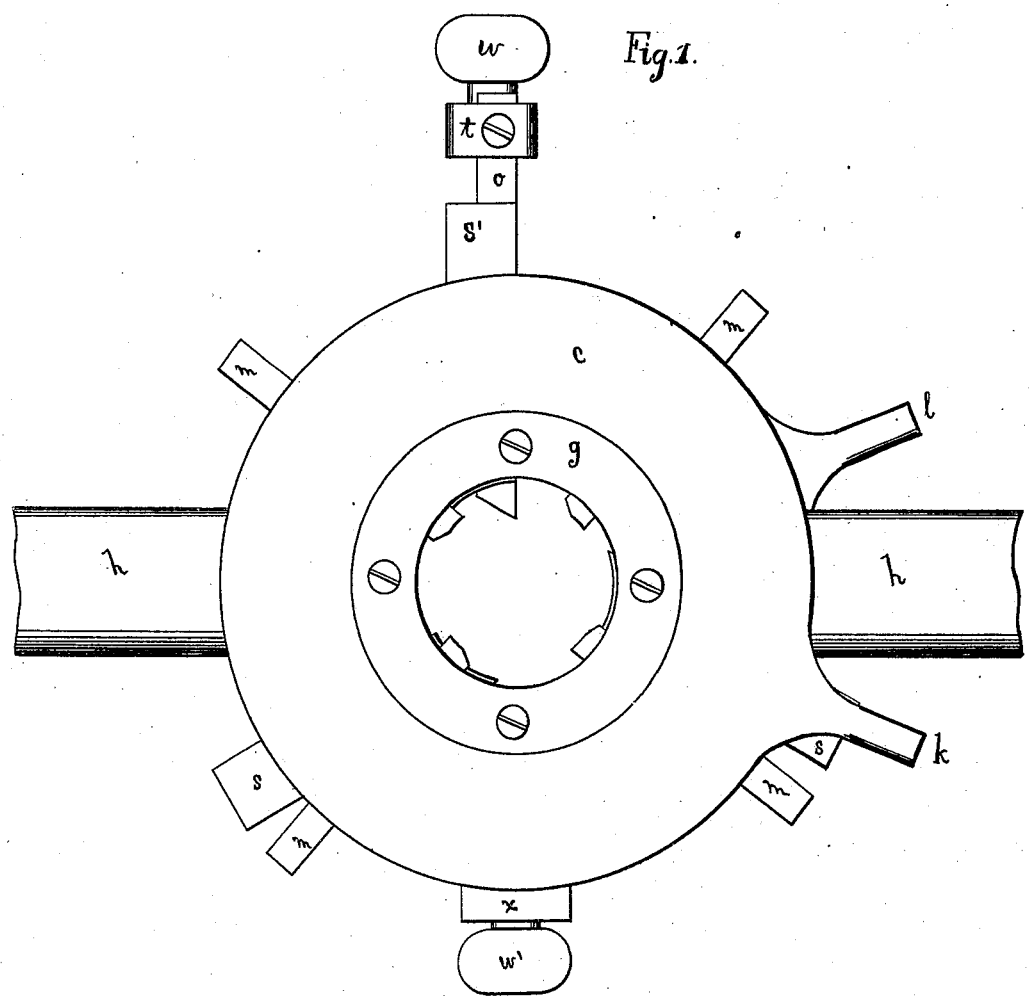
Figure 2:
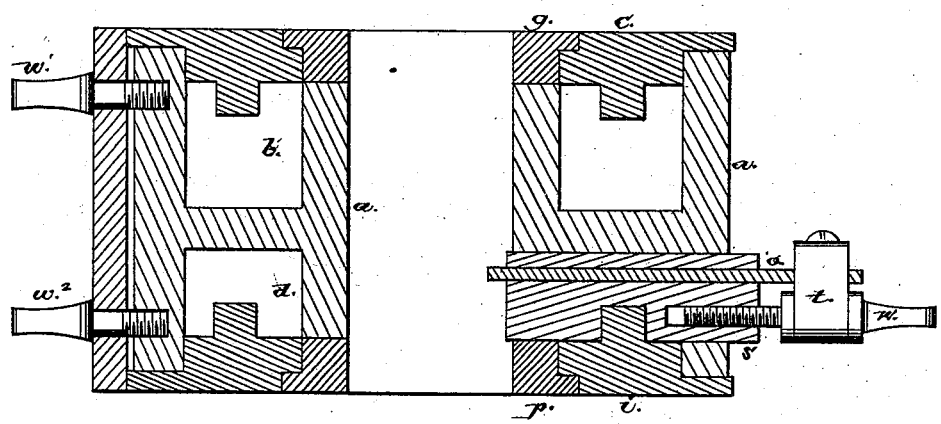
Figure 3:
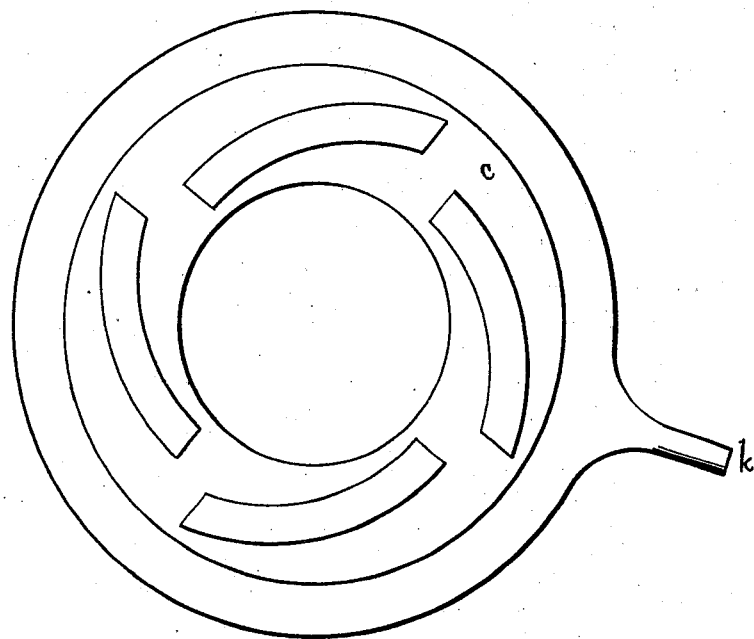

Figure 1 is a front view of the machine. Fig. 2 is a sectional view of the machine. Fig. 3 represents the interior side of the cam-ring, which operates the threading-dies.

The handles $h$ $h$ are attached to opposite sides of the circular frame or ring $a$, to which all the operating parts are attached. The frame $a$ has a central hole through which the pipe to be threaded passes. There is a circular groove, $b$ and $d$, in each end of the frame. The cam-rings $c$ and $i$ are placed against the ends of the frame $a$, and held in position by the face-plates $g$ and $p$, so that they may be turned by means of their handles $k$ and $l$, to adjust the dies and guides and cutting-off tool. The face-plates $g$ and $p$ are fastened by screws to the ends of the frame $a$. The concentric cams, on the cam-rings $c$ and $i$, enter the circular grooves in the ends of the frame $a$. The cams on the ring $c$ enter notches in the dies $m$ $m$ $m$ $m$, the dies passing radially through the sides of the frame $a$. The dies are moved to and from the center of the frame $a$, and adjusted by turning the cam-ring $c$ by its handle $k$. The guides $s$ $s$ $s'$ pass radially, or nearly so, through the sides of the frame $a$ and its groove $d$. The guides are notched or grooved across one side, the same as the dies. The concentric cams on the interior side of the cam-ring $i$ enter the notches in the guides, so that by turning the cam-ring $i$ by means of its handle $l$, the guides are moved to and from the center and adjusted. The guide $s'$ is grooved lengthwise on one side, and in this groove is placed the tool $o$, which is used to cut off the pipe. The guides $s$ $s$ $s'$ are not quite in line with the center of the machine, but so that the cutting-point of the tool $o$ will be in a proper condition to cut the pipe. The tool $o$ projects beyond the outer end of the guide $s'$, and passes through the tool-holder $t$, in which it is firmly held by a set-screw or other suitable means. The holder $t$ is placed between two shoulders on the thumb-screw $w$, which enters the end of the guide $s'$. By turning the thumb-screw $w$ in the guide $s'$, the holder $t$ and tool $o$ are moved toward or from the pipe and adjusted. The tool $o$ is also adjusted in its holder $t$ to compensate for wear. When the dies are operating the tool $o$ is withdrawn by the thumb-screw $w$ so that its point is within the guide $s'$. When the tool $o$ is operating, the dies are withdrawn. The thumb-screws $w^1$ $w^2$ pass through the bar $x$ and screw into the sides of frame $a$. When the guides and dies are properly adjusted the thumb-screws $w^1$ $w^2$ may be turned so as to press the bar $x$ against the circumferences of the cam-rings $c$ and $i$, and hold them firmly in position. For this purpose the cam-rings $c$ and $i$ are made to extend slightly beyond the frame $a$. Scales may be marked at the junction of the cam-ring $c$ and face-plate $g$, and of the cam-ring $i$ and face-plate $p$, to indicate the proper adjustments. When the machine is operated to thread pipe or bolts, the point of tool $o$ is withdrawn within the guide $s'$ by turning the screw $w$. The handle $l$ is turned till the guide $s$ $s$ $s'$ touch the pipe or bolt. The handle $k$ is turned till the dies are properly adjusted. The bar $x$ is then pressed against the cam-rings $c$ and $i$ by turning the screws $w^1$ $w^2$. The operator then grasps the handles $h$ $h$ and threads the pipe. When the pipe is threaded the operator turns the screw $w^1$ to relieve the pressure on the cam-ring $c$, and then turns the handle $k$ to throw out the dies and permit the pipe to be removed. When the pipe is to be cut off the dies are first withdrawn. The guides are moved in against the pipe, and held there by tightening the screw $w^2$ against the bar $x$. The cutting-tool $o$ is pressed against the pipe by turning the screw $w$ at each revolution of the cutting-tool, until the pipe is cut off. The guides hold the pipe in position while it is being severed, and the guide $s'$ which touches the pipe, forms a firm support for the tool $o$ at that point. When the dies are operating the guides keep them in proper position to cut a true and uniform thread. There is a sufficient space between each cam and the adjacent cam on the cam-rings *c* and *i* to permit the dies and guides to be withdrawn from the frame *a*, when the cam-rings have been turned till the cams are cut of the notches in the dies and guides.

I claim as my invention—

1. The guide *s'*, grooved lengthwise in combination with the tool *o*, substantially as and for the purpose herein set forth.

2. The combination of the guide *s'*, tool *o*, holder *t*, and screw *w*, substantially as and for the purpose herein set forth.

3. The bar *x*, in combination with the cam-rings *c* and *i*, substantially as and for the purpose herein set forth.

LEVI W. STOCKWELL.

Witnesses:
BRADFORD HOWLAND,
E. P. WILMOT.